March 22, 1955        B. SHORNA        2,704,683
OIL SEAL
Filed Aug. 25, 1950
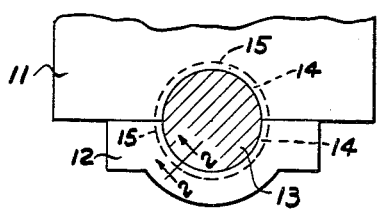
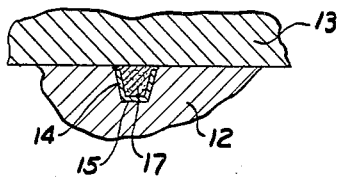
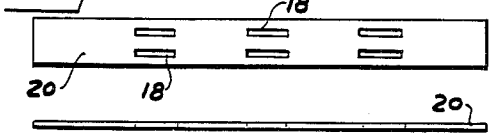
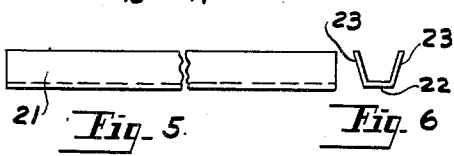
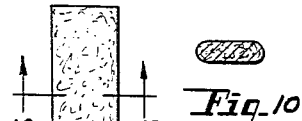
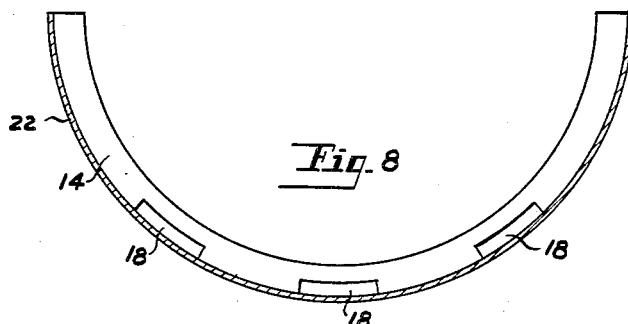
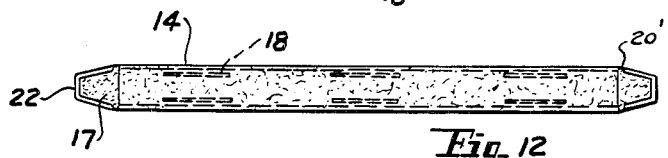
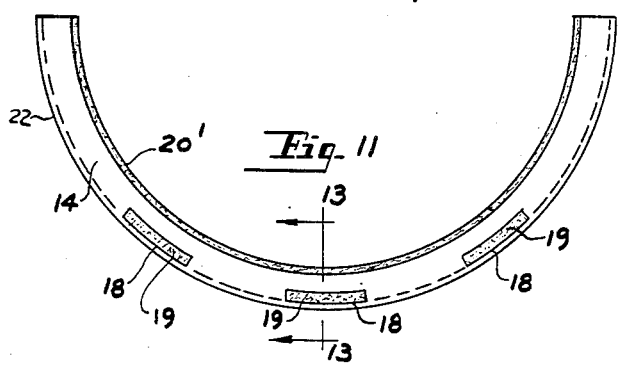
INVENTOR.
BENJAMIN SHORNA.
BY
Robert G. Sloman
ATTORNEY.

United States Patent Office 2,704,683
Patented Mar. 22, 1955

2,704,683

OIL SEAL

Benjamin Shorna, Davison, Mich.

Application August 25, 1950, Serial No. 181,522

1 Claim. (Cl. 288—3)

This invention relates to oil seals and more particularly to a semi self-oiling oil seal wick retainer and insert.

Heretofore in automobile engine production there was employed an oil seal at the rear end of the block in conjunction with the crank shaft and its main bearing, the block and the adjacent main bearing cap having formed therein opposed semi-circular channels of general U shape in cross section within which a wick was projected and oiled. It has been found however that the wicks were not sufficiently oil treated before the crank was put in place with the result that the seal produced was not fully effective for the intended purpose. Furthermore upon insertion of the wick material i. e. two wicks for each engine it was necessary to trim the material at the ends of the semi-circular channel resulting in considerable waste of material, man power and tools.

It is the object of the present invention to provide a semi circular oil seal retainer of general U shape in cross section within which there has initially been introduced and secured a suitable wick of the correct size and shape.

It is a further object of the present invention to provide an oil seal wick retainer which is adapted for insertion within the aforementioned semi-circular grooves of the engine block and bearing cap, which retainer and seal is less expensive to manufacture and which is completely effective in preventing leakage.

It is a further object of this invention to provide a novel process of manufacture wherein the elongated retainer blank is formed into U shape transversely and is also formed into a semi-circle and within which is pressed and secured a correspondingly shaped wick, with the wick thereafter being impregnated with oil and graphite.

It is a further object of this invention to provide an oil seal wick retainer and insert which is adapted for use in conjunction with all split type bearings.

These and other objects will be seen from the following specification and claim in conjunction with the appended drawing in which—

Fig. 1 is a fragmentary elevational view of a portion of a vehicle block with attached bearing cap and illustrating the arrangement of the present oil seal retainer insert with respect thereto and the shaft.

Fig. 2 is a fragmentary section on line 2—2 of Fig. 1.

Fig. 3 is a plan view of the retainer blank.

Fig. 4 is an elevational view thereof.

Fig. 5 is a partially broken away elevational view on an enlarged scale showing the blank as formed into a U shaped cross section.

Fig. 6 is an end view thereof.

Fig. 7 is a plan view of the retainer on an enlarged scale with the same formed into semi-circular shape.

Fig. 8 is a section on line 8—8 of Fig. 7.

Fig. 9 is a plan view partially broken away showing the wick blank.

Fig. 10 is a section on line 10—10 of Fig. 9.

Fig. 11 is a side elevational view of the assembled retainer and wick.

Fig. 12 is a plan view thereof, and

Fig. 13 is a section on line 13—13 of Fig. 11.

Referring to the drawing there is shown as one illustration of the use of the present semi-self oiling oil seal wick retainer and insert, a portion 11 of a vehicle block from which extends the rear end of the rotatable crank shaft 13 which is supported upon bearings, not shown, within the main bearing cap 12 which is secured to said block in a conventional manner. The present device is particularly adapted as a seal between the crank shaft and the block at its rear end, said block and bearing cap having formed therein the opposed semi-circular generally U shaped in cross section channels 15 within which the present retainer 14 is positioned and secured as illustrated.

The cross sectional shape of the present retainer is generally U shaped and particularly in a shape of an inverted truncated member within which is snugly inserted a similarly shaped wick 17.

As shown in Fig. 13 and in Fig. 11 the retainer 14 is semi-circular in shape and has in its opposite side walls a plurality of arcuate transverse slots 18 which are arranged adjacent the bottom wall of said retainer. By the present construction and the method of manufacture hereafter described lateral portions 19 of the wick 17 project outwardly through the lateral slots 18 and extend beyond the outer surfaces of the side walls of said retainer for a short distance such as about .0005 inch.

The seal or wick 17 projects at its upper end above the top edges of the side walls of the retainer, and there are formed the arcuate semi-circular laterally extending flanges 20' which overlie the edges of the side walls thereof in the manner illustrated in Figs. 2, 11 and 13.

Applicant's retainer 14 is initially formed from the blank 20 which is elongated as shown in Fig. 3 and which includes a series of parallel and longitudinally spaced slots 18.

As a first step in the process of manufacture of the present wick retainer the elongated blank 20 is formed in a die to the general U shape as illustrated in Figs. 5 and 6 and which includes the bottom wall 22 and the upwardly and outwardly inclined side walls 23.

As a second step the channeled retainer blank is then formed by a suitable die into the semi-circular shape shown in Fig. 8, and with the arcuate peripherally spaced transverse slots 18 in each of the side walls of said retainer and adjacent its bottom wall 22. It is contemplated that the slots 18 may be initially formed in the blank 20 as in Fig. 3, or on the other hand may be pierced or punched out from the side walls of the retainer as the blank is formed into the semi-circular shape shown in Fig. 8.

As a next step the wick blank shown in Figs. 9 and 10 formed preferably with a jute core and an asbestos outer weave or cover is formed in strips and of a cross sectional shape corresponding to the cross sectional shape of the semi-circular blank insert as shown in Figs. 7 and 8.

Thereafter the wick is projected by a suitable die down into the formed retainer and snugly secured therein, said wick being slightly oversize so as to be compressively retained within the formed retainer. In this process portions 19 of the wick 17 project through the retainer slots 18 and extend slightly beyond the outer walls thereof to the extent of approximately .0005 inch. At the same time the semi-circular oppositely extending flanges 20' bear against and overlie the peripheral edges of the side walls of retainer 14 in the manner illustrated in Figs. 2, 11 and 13.

As a subsequent step the insert and wick are immersed in a hot oil bath of approximately 600 to 700 degrees F. for approximately five minutes, said bath containing in solution a finely ground graphite.

While hot oil is referred to for illustration hot wax could also be employed, it being understood that the graphite is finely ground and is suspended in solution to thereby cause impregnation of the oil as well as the graphite throughout the body of the wick to thereby provide for long efficient usage.

As a final step the impregnated wick together with the retainer are then inserted within the semi-circular U shaped channels 15 which are formed within the block 11 and the bearing cap 12 as shown in Fig. 1 for purposes of illustration.

It is contemplated however that applicant's retainer with impregnated wick therein as formed may be used as a seal in connection with any rotating shaft wherein split type bearings are employed.

The immersion of the retainer and wick within the hot oil and graphite permits said oil and graphite to fully penetrate throughout the wick to thereby produce a semi-self oiling oil seal wick, together with its retainer both of which are adapted to be inserted in suitable grooves provided therefor.

By this construction the wick retains its shape in view of predetermined tolerances with the retainer assuring that this shape will be maintained. This eliminates modifying of the predetermined shape of the wick where the same has heretofore been shaped and cut and fitted within merely the conventional U-shaped channel. Furthermore it is contemplated that the present retainer may be made of plastic substance or may be made from ferrous or non-ferrous metals.

Having described my invention reference should now be had to the claim which follows for determining the scope thereof.

I claim:

In a semi self-oiling oil seal, a semi-circular channelled retainer of transverse U shape, a semi-circular oil and graphite impregnated wick of the same transverse shape firmly secured within said retainer, the side walls of said retainer having a plurality of spaced arcuate transverse slots therein at its base, said wick having lateral portions thereof extending through said slots and projecting beyond said walls, said wick extending above the peripheral edges of said retainer, and semi-circular lateral flanges projecting from opposite sides of said latter extended portion overlying said peripheral edges.

References Cited in the file of this patent

UNITED STATES PATENTS

| Number | Name | Date |
|---|---|---|
| 537,172 | Albrecht | Apr. 9, 1895 |
| 728,547 | Crofts | May 19, 1903 |
| 889,669 | Evens | June 2, 1908 |
| 951,827 | Miller | Mar. 15, 1910 |
| 1,347,388 | Lacerda | July 20, 1920 |
| 1,545,092 | Ford | July 7, 1925 |
| 1,817,238 | Cremean | Aug. 4, 1931 |
| 1,907,023 | Webb | May 2, 1933 |
| 2,146,677 | Johnson | Feb. 7, 1939 |
| 2,209,578 | Rainey et al. | July 30, 1940 |
| 2,415,888 | Joy | Feb. 18, 1947 |
| 2,630,356 | Johnson | Mar. 3, 1953 |